US008782128B2

(12) United States Patent
Cardona et al.

(10) Patent No.: US 8,782,128 B2
(45) Date of Patent: Jul. 15, 2014

(54) GLOBAL QUEUE PAIR MANAGEMENT IN A POINT-TO-POINT COMPUTER NETWORK

(75) Inventors: Omar Cardona, Cedar Park, TX (US); Vinit Jain, Austin, TX (US); Renato J. Recio, Austin, TX (US); Rakesh Sharma, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 443 days.

(21) Appl. No.: 13/276,152

(22) Filed: Oct. 18, 2011

(65) Prior Publication Data

US 2013/0097600 A1   Apr. 18, 2013

(51) Int. Cl.
*G06F 15/16* (2006.01)

(52) U.S. Cl.
USPC .......................................... 709/203; 709/226

(58) Field of Classification Search
CPC ...................................................... H04L 67/00
USPC ............... 709/203, 226; 707/633–660; 718/1
See application file for complete search history.

(56) References Cited

U.S. PATENT DOCUMENTS

| 7,702,826 | B2 | 4/2010 | Oztaskin et al. ............... 710/26 |
| 8,027,354 | B1 | 9/2011 | Portolani et al. |
| 8,175,863 | B1* | 5/2012 | Ostermeyer et al. ........... 703/22 |
| 2004/0267866 | A1 | 12/2004 | Carollo et al. ................ 709/200 |
| 2005/0188329 | A1* | 8/2005 | Cutler et al. ................... 715/804 |
| 2008/0117909 | A1* | 5/2008 | Johnson ......................... 370/392 |
| 2008/0148281 | A1 | 6/2008 | Magro et al. ................... 719/314 |
| 2009/0144183 | A1* | 6/2009 | Gatchell et al. ................ 705/34 |
| 2009/0276771 | A1* | 11/2009 | Nickolov et al. ............. 717/177 |
| 2009/0319609 | A1* | 12/2009 | Ferraro ......................... 709/204 |
| 2010/0107162 | A1 | 4/2010 | Edwards et al. |
| 2010/0115101 | A1 | 5/2010 | Lain et al. |
| 2010/0131636 | A1 | 5/2010 | Suri et al. ...................... 709/224 |
| 2010/0257263 | A1 | 10/2010 | Casado et al. ................ 709/223 |
| 2010/0275250 | A1* | 10/2010 | Devadoss et al. ................. 726/6 |
| 2011/0103259 | A1 | 5/2011 | Aybay et al. |
| 2011/0119423 | A1 | 5/2011 | Kishore et al. |
| 2011/0170550 | A1 | 7/2011 | Takashima |
| 2011/0255538 | A1 | 10/2011 | Srinivasan et al. |
| 2011/0299537 | A1 | 12/2011 | Saraiya et al. |
| 2012/0005521 | A1 | 1/2012 | Droux et al. |
| 2012/0023546 | A1 | 1/2012 | Kartha et al. |

(Continued)

OTHER PUBLICATIONS

"Virtual Machine Networking: Standards and Solutions," Cisco White Paper, Cisco, 2011, pp. 1-10.

(Continued)

*Primary Examiner* — Frantz Jean
(74) *Attorney, Agent, or Firm* — VanLeeuwen & VanLeeuwen; Matthew W. Baca

(57) ABSTRACT

An approach is provided in which a local module receives a data frame initiated by a first virtual machine and has a target destination at a second virtual machine, which executes on a destination host system. The local module identifies a destination local port ID and a destination global queue pair number corresponding to the second virtual machine. In one embodiment, the destination local port ID corresponds to the destination host, but the destination global queue pair number is independent of the destination host. The local module includes the destination global queue pair number and the destination local port ID in an overlay header and encapsulates the data frame with the overlay header, which results in an encapsulated frame. In turn, the local module sends the encapsulated frame through a computer network to the second virtual machine.

25 Claims, 12 Drawing Sheets

(56) References Cited

U.S. PATENT DOCUMENTS

| | | |
|---|---|---|
| 2012/0042054 A1 | 2/2012 | Kotha et al. |
| 2012/0069770 A1 | 3/2012 | Hiscock |
| 2012/0207174 A1 | 8/2012 | Shieh |

OTHER PUBLICATIONS

"Junos Space Virtual Control," Juniper Networks, Inc., Mar. 2011, pp. 1-6.

"I/O Virtualization Using Mellanox InfiniBand and Channel I/O Virtualization (CIOV) Technology," Mellanox Technologies, Inc., 2007, pp. 1-16.

U.S. Appl. No. 13/204,211, filed Aug. 5, 2011, Cardona et al.

U.S. Appl. No. 13/204,260, filed Aug. 5, 2011, Cardona et al.

Office Action for U.S. Appl. No. 13/204,260 (Cardona et al., "Distributed Overlay Network Data Traffic Management by a Virtual Server," filed Aug. 5, 2011), U.S. Patent and Trademark Office, mailed Feb. 28, 2013, 31 pages.

Office Action for U.S. Appl. No. 13/560,515 (Cardona et al., "Distributed Overlay Network Data Traffic Management by a Virtual Server," filed Jul. 27, 2012), U.S. Patent and Trademark Office, mailed Feb. 27, 2013, 29 pages.

Office Action for U.S. Appl. No. 13/204,211 (Cardona et al., "Virtual Switch Data Control in a Distributed Overlay Network," filed Aug. 5, 2011), U.S. Patent and Trademark Office, mailed Apr. 12, 2013, 23 pages.

\* cited by examiner

Local Table Store 400

| Global Queue Pair # | Local Port ID | Virtual Function ID |
|---|---|---|
| 100 | ABC | VF2 |
| 342 | DEF | |
| 230 | HGI | |

Encapsulated Frame 440

| Overlay Header 445 | | | | | Data Frame 450 | | | |
|---|---|---|---|---|---|---|---|---|
| Source LID | Dest. LID | Source GQP | Dest. GQP | ... | Local Routing Header | Base Transport Header (DGQP) | Data | ... |

Policy Table
1000

| | SOURCE VM | DESTINATION VM | POLICY |
|---|---|---|---|
| 1010 | VM 1 | ANY | Must Go Through Firewall |
| 1020 | VM 1, VM-2, VM-5 | VM-7, VM-8 | Data Must Be Dropped |
| 1030 | VM-3 Port 443 | ANY | Data Must Go Through SSL Accellerator |
| 1040 | ANY | VM-3 Port 443 | Data Must Go Through SSL Accelerator |
| | ... | ... | ... |

*FIG. 10*

GLOBAL QUEUE PAIR MANAGEMENT IN A POINT-TO-POINT COMPUTER NETWORK

BACKGROUND

The present disclosure relates to utilizing global queue pair numbers in a point-to-point computer network environment to provide flexible virtual machine migration between host systems.

The InfiniBand™ Architecture (IBA) is an industry-standard architecture for server I/O and inter-server communication. The IBA architecture is based on a non-bus-oriented I/O structures and includes two basic characteristics, which are point-to-point connections and channel messaging semantics. The point-to-point connections avoid arbitration issues, provide fault isolation, and allow large-sized scaling by the use of switched networks. Regarding channel messaging semantics, the IBA transfers commands and data between hosts and devices as low-overhead messages using network adapter port identifiers and virtual machine queue pair numbers that are specific to a particular host system.

BRIEF SUMMARY

According to one embodiment of the present disclosure, an approach is provided in which a local module receives a data frame initiated by a first virtual machine and has a target destination at a second virtual machine, which executes on a destination host system. The local module identifies a destination local port ID and a destination global queue pair number corresponding to the second virtual machine. In one embodiment, the destination local port ID corresponds to the destination host, but the destination global queue pair number is independent of the destination host. The local module includes the destination global queue pair number and the destination local port ID in an overlay header and encapsulates the data frame with the overlay header, which results in an encapsulated frame. In turn, the local module sends the encapsulated frame through a computer network to the second virtual machine.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 4A is a diagram showing a local table that includes local table entries utilized by a local module to encapsulate egress data frames and process ingress data frames;

FIG. 4B is a diagram showing an encapsulated frame that includes an overlay header and a data frame;

FIG. 10 is a table showing policies that correspond to source virtual machines and destination virtual machines;

DETAILED DESCRIPTION

Figure 1:
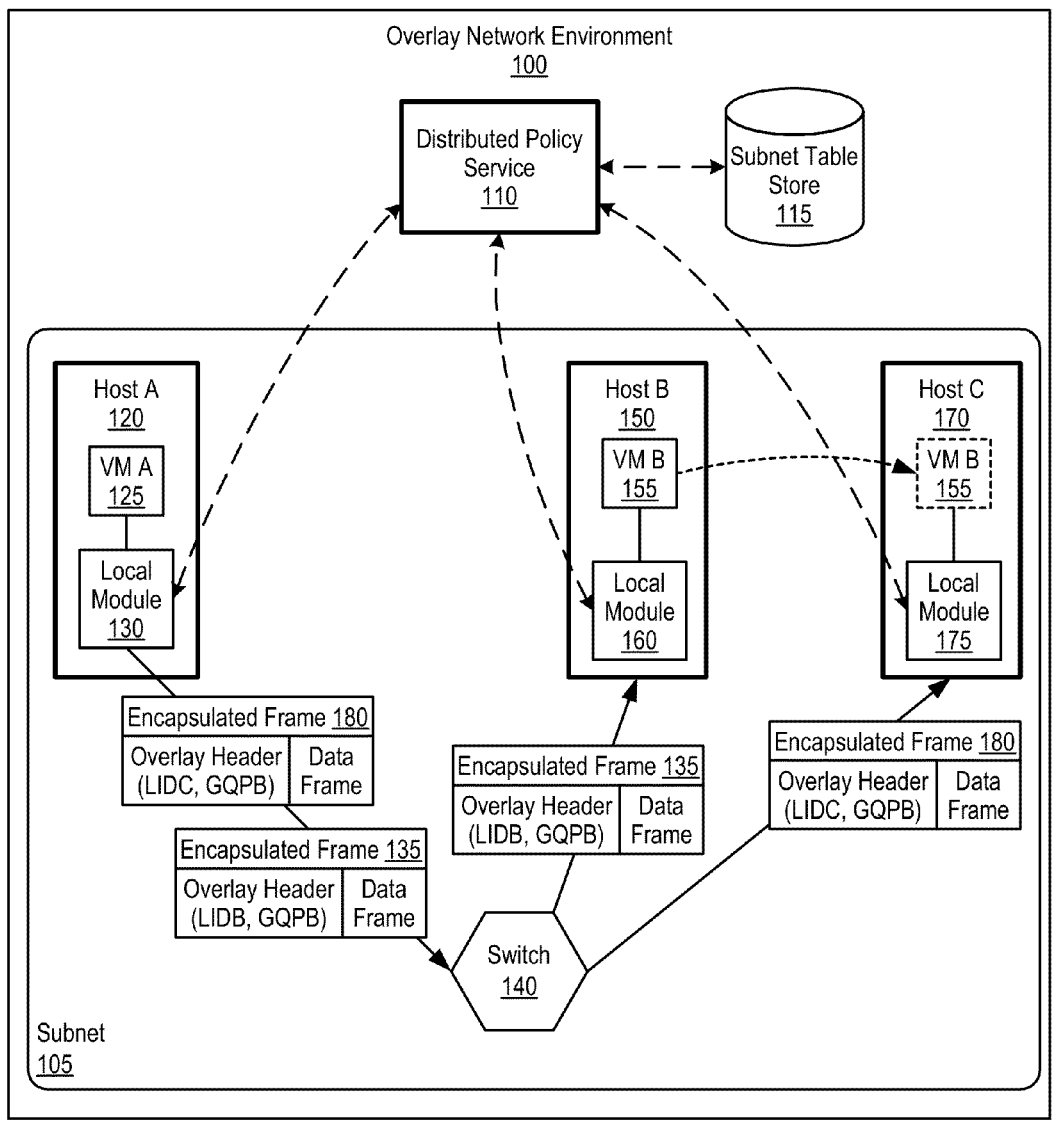
FIG. 1 is diagram showing an overlay network environment that assigns global queue pair numbers to virtual machines within a subnetwork to support flexible virtual machine migration.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

FIG. 1 is diagram showing an overlay network environment that assigns global queue pair numbers to virtual machines within a subnetwork to support flexible virtual machine migration. Overlay network environment 100 utilizes overlay headers to manage data frame traversal between a source virtual machine and a destination virtual machine through subnetwork 105. In one embodiment, the overlay headers may include physical path translations based upon logical actions that direct frames to traverse through one or more appliances (e.g., firewalls, compression devices, etc., see FIGS. 9-10 and corresponding text for further details).

Distributed policy service 110 assigns global queue pair numbers to virtual machines within subnetwork 105. The virtual machines use the global queue pair numbers to send/receive data frames to each other based on a point-to-point architecture, such as an InfiniBand™ architecture. In one embodiment, distributed policy service 110 provisions global queue pair numbers according to a 24-bit address space based on the InfiniBand™ architecture.

Since each virtual machine has a global queue pair number that is unique within subnetwork 105, an administrator may easily migrate a virtual machine from one host system to a different host system without queue pair numbering conflicts. For example, FIG. 1 shows that virtual machine B 155 migrates from host B 150 to host C 170.

Distributed policy service 110 manages virtual machine locations by associating a "local port ID" to each global queue pair number (see FIG. 4A and corresponding text for further details). A local port ID identifies a port located on a network adapter (channel adapter) that couples to a host executing the corresponding virtual machine (see FIGS. 2-3 and corresponding text for further details). Distributed policy service 110 stores table entries in subnetwork table store 115 that associates the global queue pair numbers to the local port IDs.

Each of hosts 120-170 executes a local module (local modules 130-175), which communicates with distributed policy service 110 to obtain and provide the most recent table entry information. When a local module receives a data frame from its corresponding source virtual machine that is targeted for a destination virtual machine, the local module encapsulates the data frame with an overlay header, which includes a destination global queue pair number (corresponds to the destination virtual machine) and a destination local port ID (corresponds to the destination host's adapter port).

When virtual machine B 155 executes on host B 155, local module 130 encapsulates data frames generated by virtual machine A 125 and targeted for virtual machine B 155 similar to encapsulated frame 135. As can be seen, encapsulated frame 135's overlay header includes a local port ID corresponding to host B 150 (LIDB) and includes virtual machine B 155's global queue pair number (GQPB). As such, encapsulated frame 135 traverses through switch 140 and arrives at host B 150. Local module 160 decapsulates encapsulated frame 135 and passes the data frame to virtual machine B 155 (see FIG. 3 and corresponding text for further details).

When local module 130 receives notification that virtual machine B 155 migrates to host C 170, local module 130 encapsulates data frames generated by virtual machine A 125 similar to encapsulated frame 180. As can be seen, encapsulated frame 180's overlay header now includes a new local port ID corresponding to host C 170 (LIDC), but still includes virtual machine B 155's same global queue pair number (GQPB) since the global queue pair number does not change. As such, encapsulated frame 180 traverses through switch 140 and arrives at host C 170. Local module 175 decapsulates encapsulated frame 180 and passes the data frame to virtual machine B 155 executing on host C 170.

Figure 2:
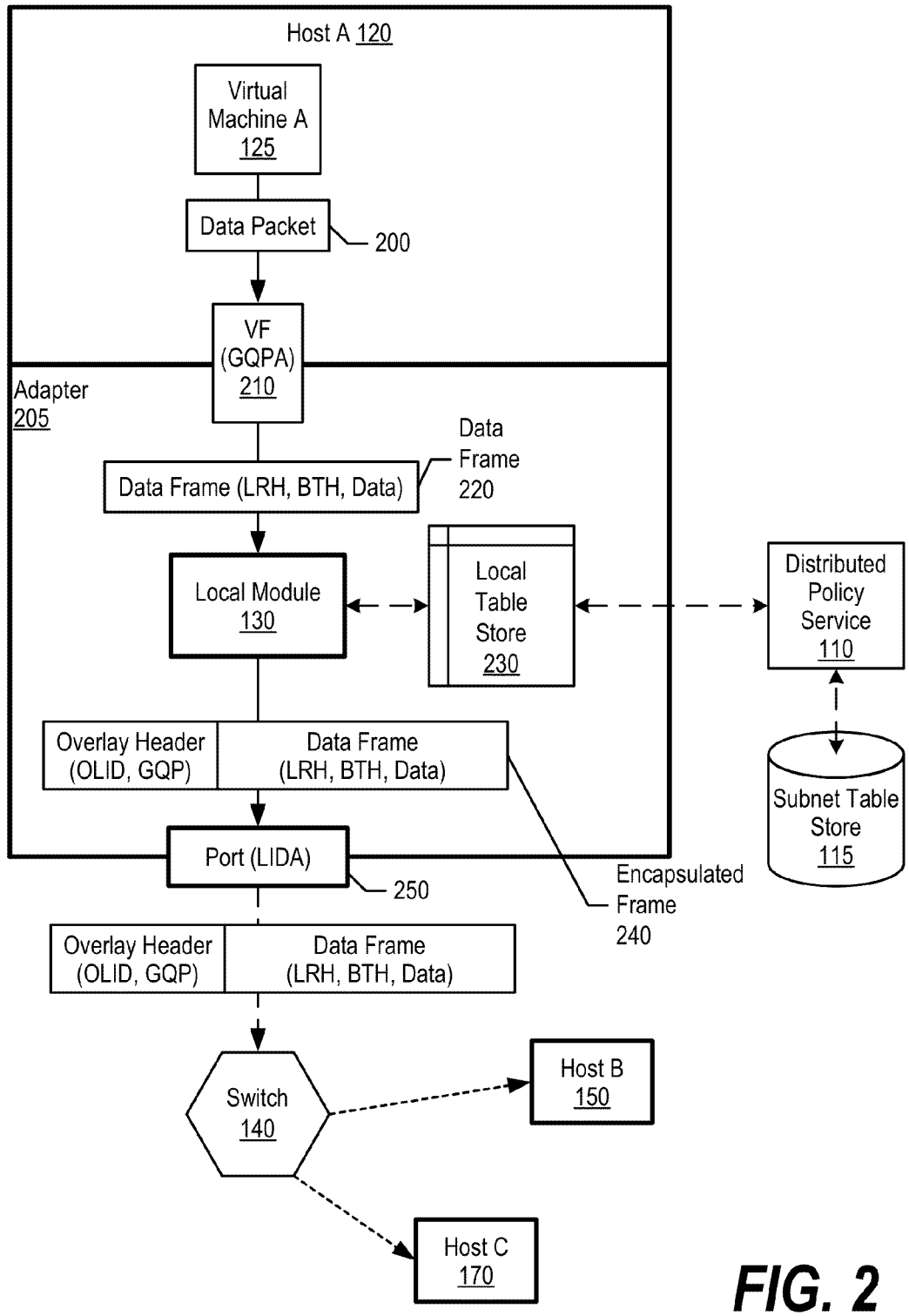
FIG. 2 is a diagram showing a local module encapsulating an egress data frame with an overlay header.

FIG. 2 is a diagram showing a local module encapsulating an egress data frame with an overlay header. Virtual machine A 125 executes on host A 120 and generates data packet 200. Data packet 200 traverses through virtual function 210, which is dedicated to virtual machine A 125 by virtue of virtual machine A 125's global queue pair number (GQPA). Virtual function 210 formats data packet 200 to produce data frame 220 that, in one embodiment, includes a local routing header and a base transport header. The base transport header includes a destination global queue pair number that corresponds to a destination virtual machine (see FIG. 4B and corresponding text for further details).

Local module 130, which executes on adapter 205, extracts the destination global queue pair number from data frame 220 and looks up its corresponding local port ID in local table store 230. Local table store 230 includes table entries based on information provided by local module 130 and distributed policy service 110. Distributed policy service 110 stores table entries pertaining to a particular subnetwork in subnetwork store 115. Local module 130 identifies the corresponding destination local port ID, and includes the destination local port ID and the destination global queue pair number in an overlay header. In turn, local module 130 encapsulates data frame 220 with the overlay header to generate encapsulated frame 240.

Encapsulated frame 240 traverses through port 250 (with a "LIDA" local port ID) and enters switch 140. Switch 140 sends the frame to the appropriate host B 150 or host C 170 based on the destination local port ID included in the overlay header. In turn, the destination host decapsulated the encapsulated frame and provides it to the appropriate destination virtual machine (see FIG. 3 and corresponding text for further details). In one embodiment, each host system joins a group (e.g., Mcast) in order for switch 140 to identify the appropriate host. In another embodiment, if the destination host is not known, switch 140 performs an "Mcast All" to send the frame to the host systems.

Figure 3:
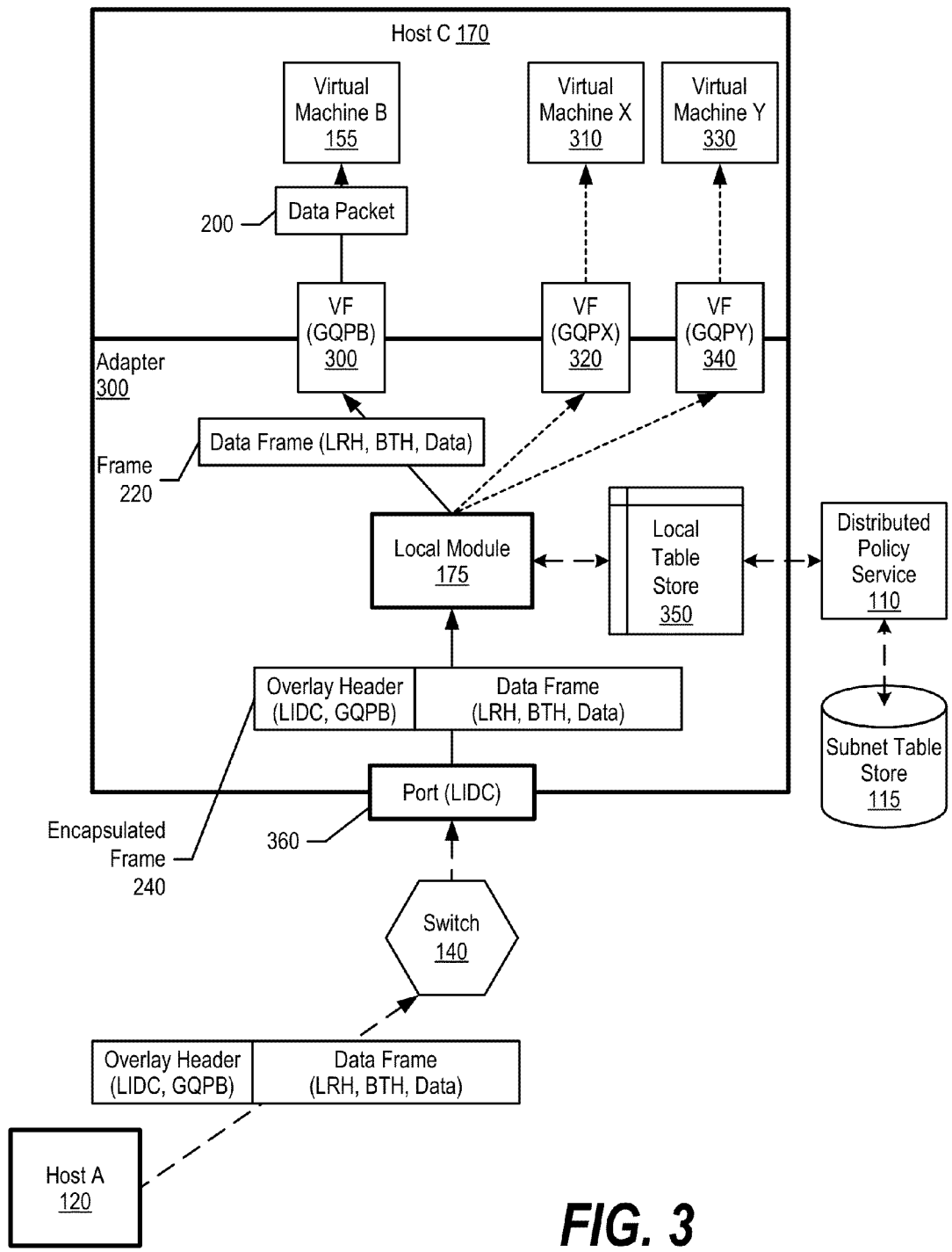
FIG. 3 is a diagram showing a host system receiving and processing an encapsulated data frame.

FIG. 3 is a diagram showing a host system receiving and processing an encapsulated data frame. Host C 170 receives an encapsulated data frame on port 360 from host A 120 via switch 140. Port 360 corresponds to a specific local port ID (LIDC), which enables host C 170 to receive applicable data frames.

Local module 175, which executes on adapter 300, decapsulates encapsulated frame 240 and extracts a destination global queue pair number (GQPB) from the overlay header. As such, local module 175 accesses local table store 350 to match the destination global queue pair number with a virtual function identifier, which also corresponds to the destination virtual machine (see FIG. 4A and corresponding text for further details). In one embodiment, distributed policy service 110 provides address mapping information to local module 175 that it retrieves from subnetwork table store 115. Once identified, local module 175 sends frame 220 to the appropriate virtual function (virtual function 300), which sends data packet 200 to destination virtual machine B 155. As can be seen, local module 175 also supports virtual machines X 310 and Y 330 via virtual functions 320 and 340 (each having their own unique destination global queue pair numbers and virtual function identifiers, respectively).

FIG. 4A is a diagram showing a local table that includes local table entries utilized by a local module to encapsulate egress data frames and process ingress data frames. Local table store 400 includes local table entries that include a global queue pair number (column 410), a local port ID (column 420), and may also include a virtual function ID for local virtual machines (column 430). The global queue pair number corresponds to a specific virtual machine and the local port ID identifies a host system port that executes the corresponding virtual machine. In one embodiment, the local module receives local port ID information corresponding to other host systems from the distributed policy service and stores the local port ID information in local table store 400.

For egress data frames, the local module extracts a destination global queue pair number corresponding to a destination virtual machine from the data frame (e.g. base transport header field) and accesses local table store 400 to identify its corresponding destination local port ID. For example, the extracted global queue pair number may be "342," and, using FIG. 4A as an example local table, the local module identifies the corresponding destination local port ID as "DEF." The local module generates an overlay header with the destination global queue pair number and the destination local port ID and, in turn, encapsulates the data frame with the overlay header and sends the encapsulated data frame to the destination virtual machine (see FIG. 5 and corresponding text for further details).

For ingress data frames, the local module extracts the destination global queue pair number from the overlay header and looks up the corresponding virtual function ID. Using FIG. 4A as an example, the local module may extract a destination global queue pair number of "100" and the local module identifies a corresponding virtual function ID of "VF2." In turn, the local module sends the extracted data frame to virtual function "VF2," which sends it to the destination virtual machine.

FIG. 4B is a diagram showing an encapsulated frame that includes an overlay header and a data frame. Encapsulated frame 440 includes overlay header 445 and data frame 450. Overlay header 445 includes fields 455-470. Field 455 includes a source local port ID, which identifies the hosting port of the source virtual machine (e.g., source host system's network adapter port). Field 460 includes a destination local port ID, which identifies the hosting port of the destination virtual machine. Field 465 includes a source global queue pair number that corresponds to the source virtual machine, and field 470 includes a destination global queue pair number that corresponds to the destination virtual machine. As one skilled in the art can appreciate, more or less fields may be included in overlay header 445 than what is shown in FIG. 4B.

Data frame 450 (e.g., an InfiniBand™ data frame) includes fields 475-485. Field 475 includes a local routing header, which may include a source local port ID corresponding to the source virtual machine along with other protocol and service level information. Field 480 includes a base transport header, which includes a destination global queue pair number inserted by the virtual machine. The destination global queue pair number corresponds to the destination virtual machine targeted to receive data included in field 485. As one skilled in the art can appreciate, more or less fields may be included in data frame 450 than what is shown in FIG. 4B.

Figure 5:
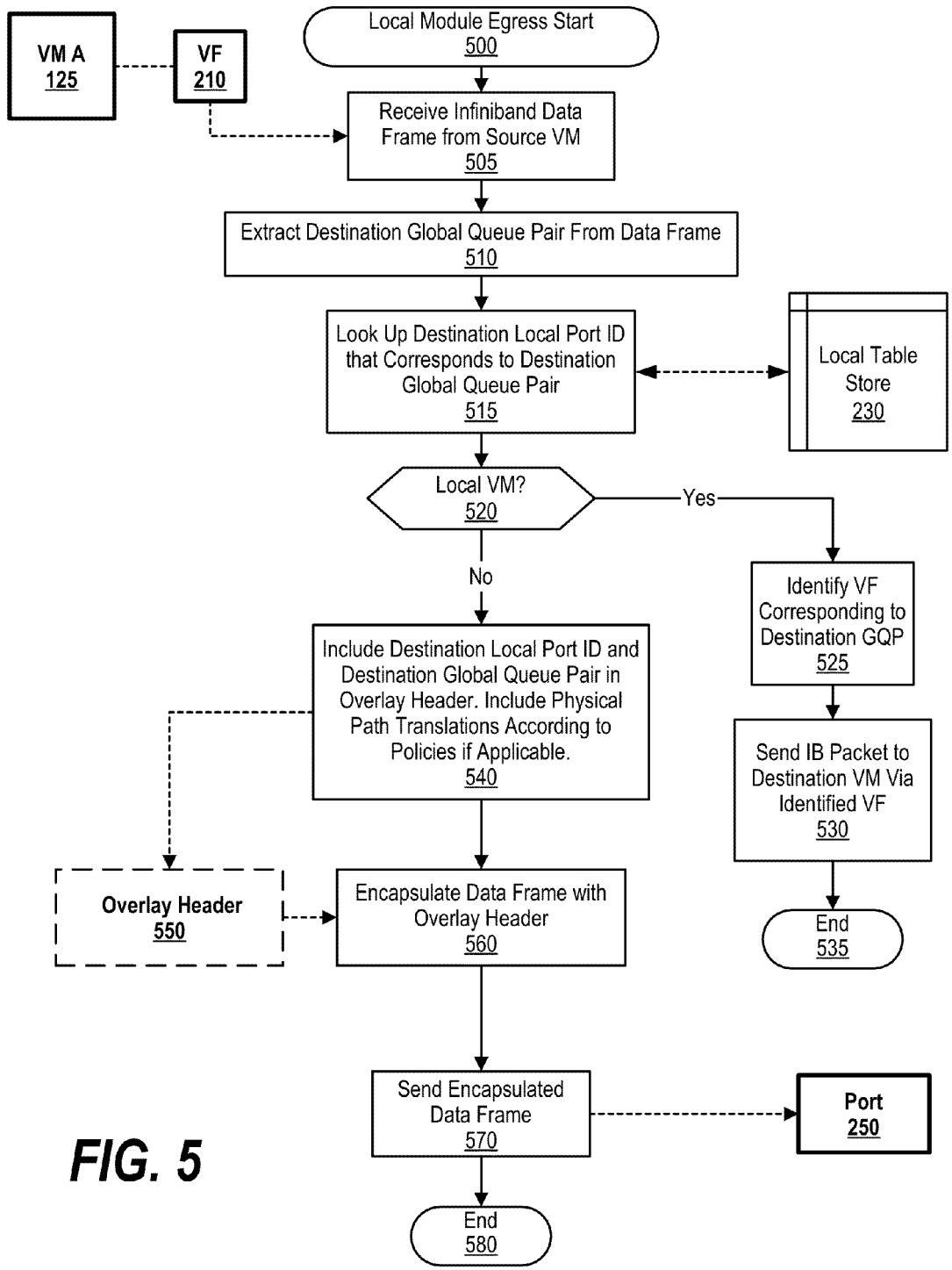
FIG. 5 is a flowchart showing steps taken in a local module encapsulating an egress data frame with an overlay header that includes a destination global queue pair number and a destination local port ID.

FIG. 5 is a flowchart showing steps taken in a local module encapsulating an egress data frame with an overlay header that includes a destination global queue pair number and a destination local port ID. Processing commences at 500, whereupon the local module receives a frame of data from virtual machine A 125 through virtual function 210 at step 505. In one embodiment, the frame of data is an InfiniBand™ data frame, which may include a local routing header and a base transport header (see FIG. 4B and corresponding text for further details).

At step 510, the local module extracts a destination global queue pair number from the received data frame, such as from the base transport header field in the data frame. Next, the local module looks up a destination local port ID in local table store 230 that corresponds to the extracted destination global queue pair number. The destination local port ID identifies an adapter port that corresponds to the destination virtual machine (e.g., a network adapter that resides on the host system that executes the virtual machine). In one embodiment, a distributed policy service sends local port ID updates to local modules when a virtual machines migrates to a different host system.

A determination is made as to whether the destination virtual machine is a local virtual machine (e.g., one that resides on the same host system as virtual machine A 125, decision 520). If the destination virtual machine is local, decision 520 branches to the "Yes" branch, whereupon the local module identifies a virtual function that corresponds to the destination global queue pair number (step 525), and forwards the data frame to the destination virtual machine via the identified virtual function (step 530). Processing ends at 535.

On the other hand, if the destination virtual machine is not local, decision 520 branches to the "No" branch, whereupon the local module generates overlay header 550 and includes the destination local port ID and the destination global queue pair number in overlay header 550 at step 540. In one embodiment, the local module may also include physical path translations according to one or more overlay network policies that, for example, may route the data frame through an appliance such as a firewall, etc. (see FIGS. 9-10 and corresponding text for further details).

The local module encapsulates the data frame with overlay header 550 at step 560, and sends the encapsulated data frame to the destination virtual machine through port 250 (step 570). Processing ends at 580.

Figure 6:
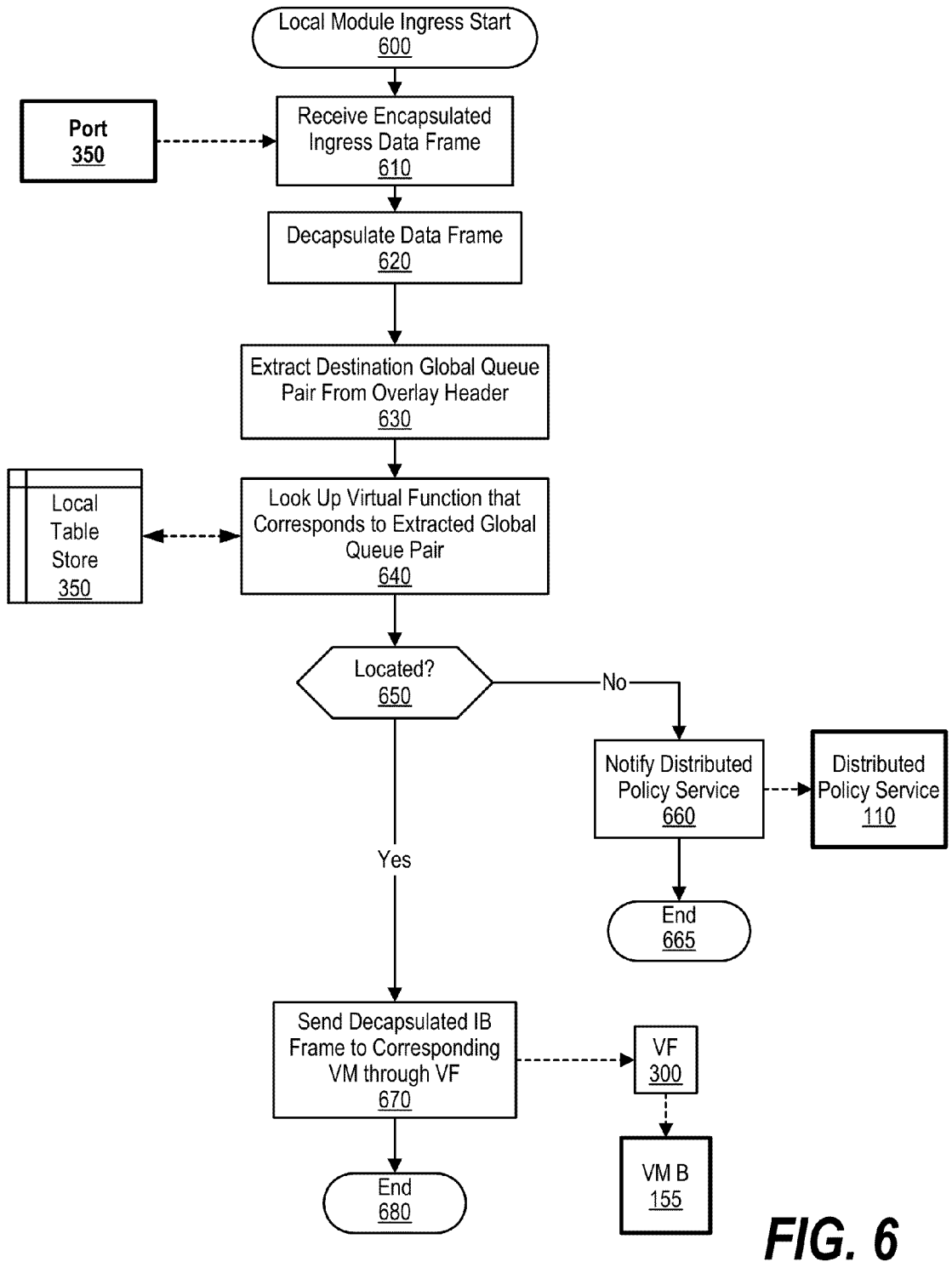
FIG. 6 is a flowchart showing steps taken in a local module decapsulating an encapsulated data frame and sending a decapsulated data frame to a corresponding destination virtual machine.

FIG. 6 is a flowchart showing steps taken in a local module decapsulating an encapsulated data frame and sending a decapsulated data frame to a corresponding destination virtual machine. Local module processing commences at 600, whereupon the local module receives an encapsulated data frame via the destination host system's port 350 (step 610). Port 350 corresponds to a destination local port ID that is included in the encapsulated data frame's overlay header.

At step 620, the local module decapsulated the data frame, and extracts the destination global queue pair number from the overlay header at step 630. As discussed herein, the destination global queue pair number is unique to a particular virtual machine within a computer subnetwork, regardless of which host system executes the virtual machine.

At step 640, the local module looks up a virtual function that corresponds to the destination global queue pair number in local table store 350. Local table store 350 includes mapping entries that map global queue pair numbers to virtual functions (see FIG. 4A and corresponding text for further details).

A determination is made as to whether the local module identified a virtual function that corresponds to the destination global queue pair number (decision 650). If the local module does not identify the corresponding destination global queue pair number, decision 650 branches to the "No" branch, whereupon the local module notifies distributed policy service 110 at step 660, and ends at 665. For example, the destination virtual machine may have migrated to a different host system and, in this example, the source virtual machine that generated the encapsulated data frame is unaware of the new destination local port ID that corresponds to the new host system. As such, the source host may have included an outdated destination local port ID in the overlay header.

On the other hand, if the local module identified a virtual function that corresponds to the destination global queue pair number, decision 650 branches to the "Yes" branch, whereupon, at step 670, the local module sends the decapsulated data frame to virtual machine B 115 through virtual function 300 (the identified virtual function). Processing ends at 680.

Figure 7:
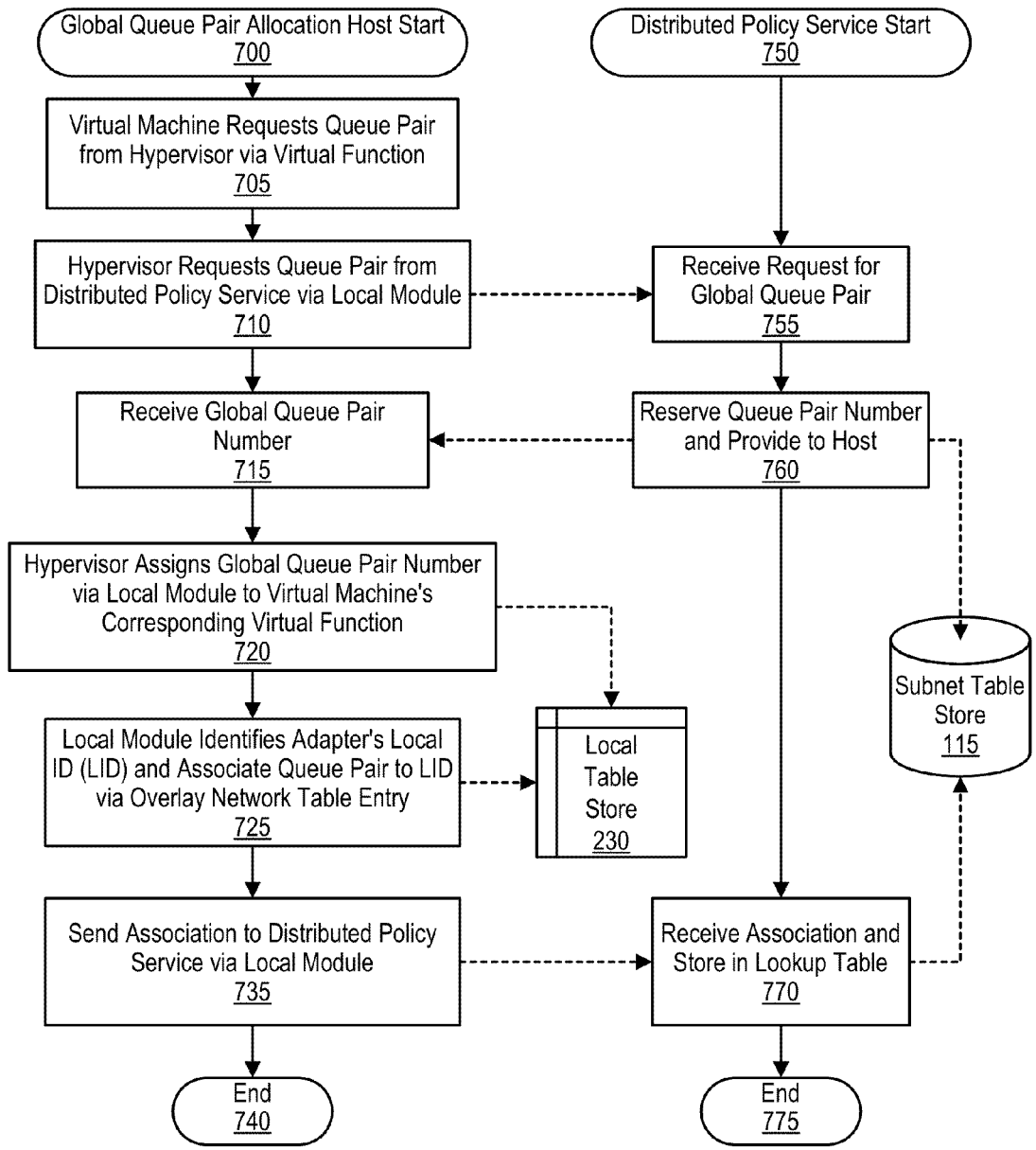
FIG. 7 is a flowchart showing steps taken in a virtual machine receiving a global queue pair number from a distributed policy service.

FIG. 7 is a flowchart showing steps taken in a virtual machine receiving a global queue pair number from a distributed policy service. Processing commences at 700, whereupon the virtual machine requests a queue pair number from the hypervisor via the virtual machine's corresponding virtual function at step 705. The hypervisor (via the local module) requests a global queue pair number from the distributed policy service at step 710.

Distributed policy service processing commences at 750, whereupon the distributed policy service receives the request for the global queue pair number at step 755. At step 760, the distributed policy service reserves a global queue pair number in subnetwork table store 115 for the requesting virtual machine and informs the local module of the reserved global queue pair number, which the local module receives at step 715.

At step 720, the hypervisor assigns a global queue pair number on the network adapter to the virtual machine's corresponding virtual function via a table entry in local table store 230. Next, at step 725, the hypervisor (or local module) identifies a network adapter's local port ID and adds the network adapter's local port ID to the table entry in local table store 230. In one embodiment, the hypervisor (or local module) generates the table entry and includes the global queue pair number, the corresponding virtual function, and the corresponding local port ID in one storage step.

At step 735, the local module sends the local port ID association information to the distributed policy service in order for the distributed policy service to provide such information to other virtual machines wishing to send data frames to the virtual machine. Host processing ends at 740.

The distributed policy service receives the local port ID association information at step 770 and updates its table entry in subnetwork table store 115 accordingly. Distributed policy service processing ends at 775.

Figure 8:
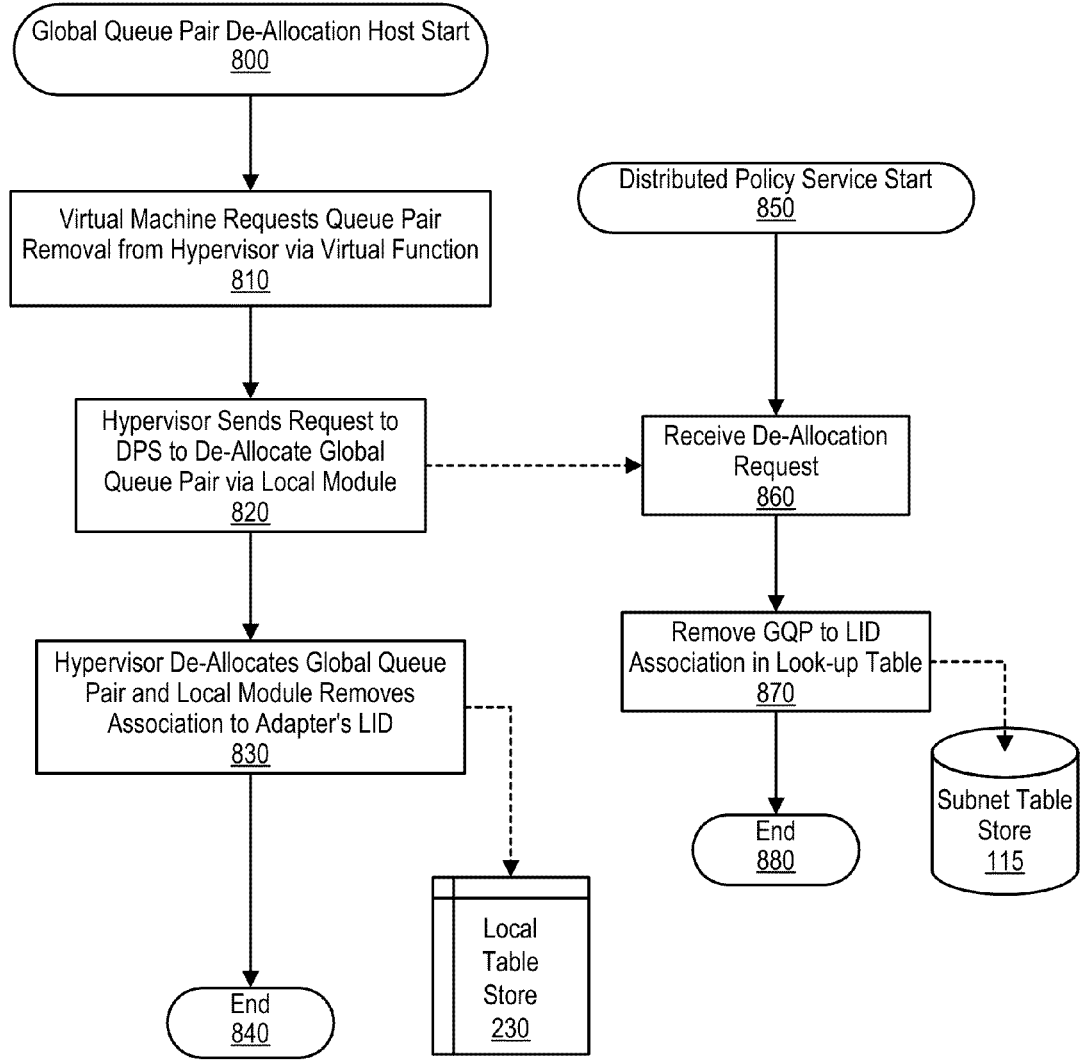
FIG. 8 is a flowchart showing steps taken in a distributed policy service de-allocating a global queue pair number from a virtual machine.

FIG. 8 is a flowchart showing steps taken in a distributed policy service de-allocating a global queue pair number from a virtual machine. Processing commences at 800, whereupon a virtual machine sends a de-allocation request to the hypervisor (or local module) at step 810. At step 820, the hypervisor sends (via the local module) a request to the distributed policy service to de-allocate the global queue pair number from its subnetwork table entries.

Distributed policy service processing commences at 850, whereupon the distributed policy service receives the de-allocation request at 860. At step 870, the distributed policy service removes the table entry from subnetwork table store 115 that associates the global queue pair number to the virtual machine's network adapter's local port ID, which frees up the global queue pair number for a different virtual machine that subsequently requests a global queue pair number. Distributed policy service processing ends at 880.

Referring back to the host system, at step 830, the local module de-allocates the global queue pair number from the virtual machine and removes the corresponding table entry from local table store 230. Host processing ends at 840.

Figure 9:
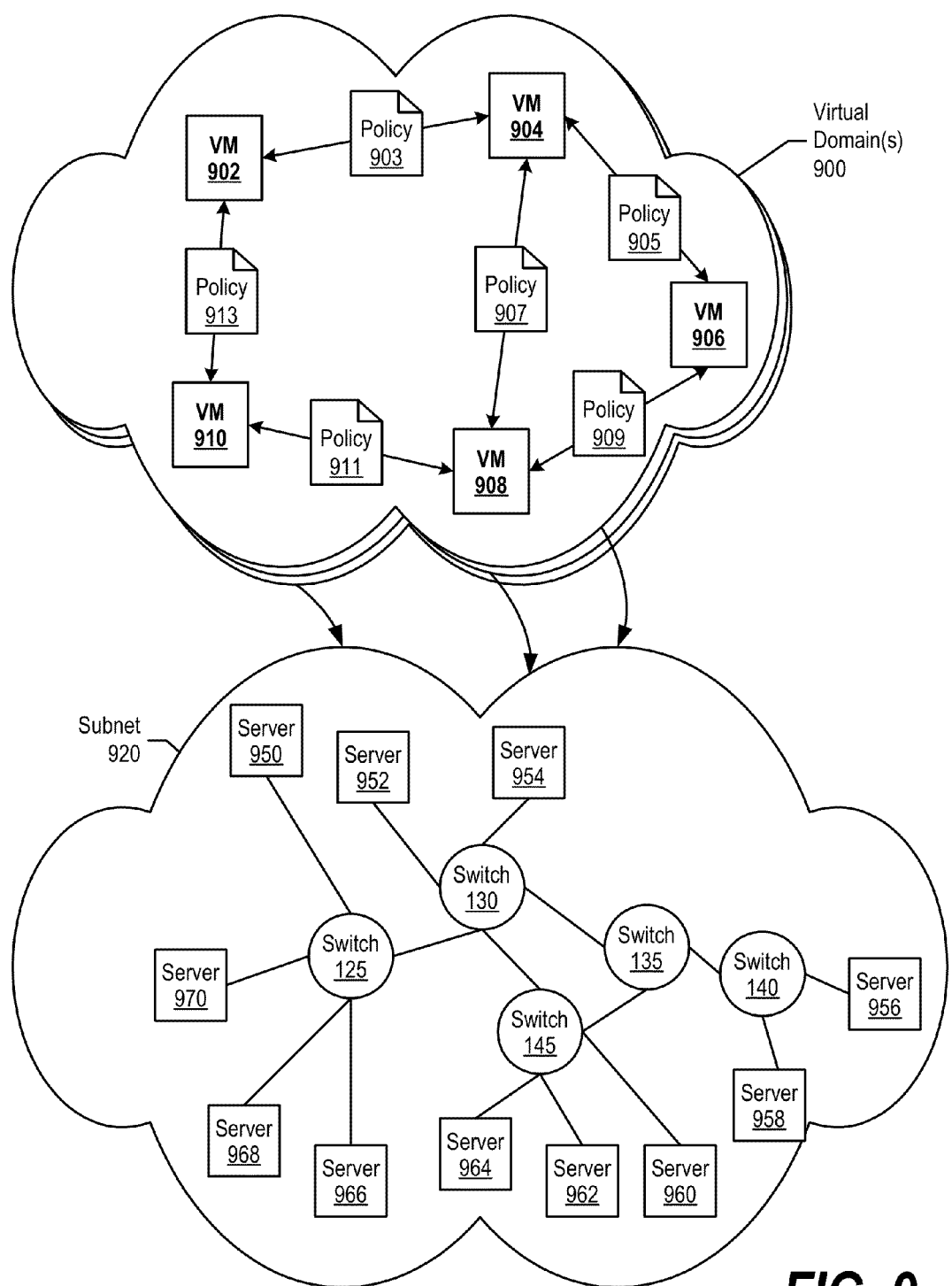
FIG. 9 is a diagram showing virtual domain abstractions that are overlayed onto a physical space.

FIG. 9 is a diagram showing virtual domain abstractions that are overlayed onto a physical space. Virtual domains 900 include policies (e.g., policies 903-913) that provide an end-to-end virtual connectivity between virtual machines (e.g., virtual machines 902-910). Each of virtual domains 900 corresponds to a unique virtual domain identifier. This allows concurrent operation of multiple virtual domains over subnetwork 920. As those skilled in the art can appreciate, some of virtual domains 900 may include a portion of virtual machines 902-910, while other virtual domains 900 may include different virtual machines and different policies than what is shown in FIG. 9.

When a source virtual machine sends data to a destination virtual machine, a policy corresponding to the two virtual machines may be utilized to describe a logical path on which the data travels (e.g., through a firewall, through an accelerator, etc.). In other words, policies 903-913 define how different virtual machines communicate with each other (or with external networks). For example, a policy may define quality of service (QoS) requirements between a set of virtual machines; access controls associated with particular virtual machines; or a set of virtual or physical appliances (equipment) to traverse when sending or receiving data. In addition, some appliances may include accelerators such as compression, IP Security (IPSec), SSL, or security appliances such as a firewall or an intrusion detection system. In addition, a policy may be configured to disallow communication between the initiating virtual machine and the destination virtual machine.

Virtual domains 900 are logically overlayed onto subnetwork 920, which includes physical entities such as switches 925-940 and servers 950-970. While the way in which a policy is enforced in the system affects and depends on subnetwork 920, virtual domains 900 are more dependent upon logical descriptions in the policies. As such, multiple virtual domains 900 may be overlayed onto subnetwork 920.

FIG. 10 is a table showing policies that correspond to source virtual machines and destination virtual machines. Policy table 1000 includes policies 1010-1040, which logically dictate how different virtual machines (or external networks) communicate with each other (e.g., send data). Policy 1010 indicates that whenever virtual machine 1 sends data to a destination virtual machine, the data must go through a firewall. Note that the policy does not dictate a particular physically firewall, but rather logically dictates that it must go through a firewall. In one embodiment, policy table 1000 includes policies for a particular virtual domain based upon the particular virtual domain's unique identifier. In one embodiment, policy table includes information that refers virtual machines in a context of their corresponding virtual networks.

Policy 1020 dictates that whenever virtual machine 1, 2, or 5 sends data to virtual machine 7 or 8, that the data must be dropped. Policy 1030 dictates that whenever virtual machine 3 (from port 443) sends data to another virtual machine, that the data must pass through an SSL accelerator. Likewise, policy 1040 dictates that whenever the destination of data is virtual machine 3's port 443, that the data must pass through an SSL accelerator.

Figure 11:
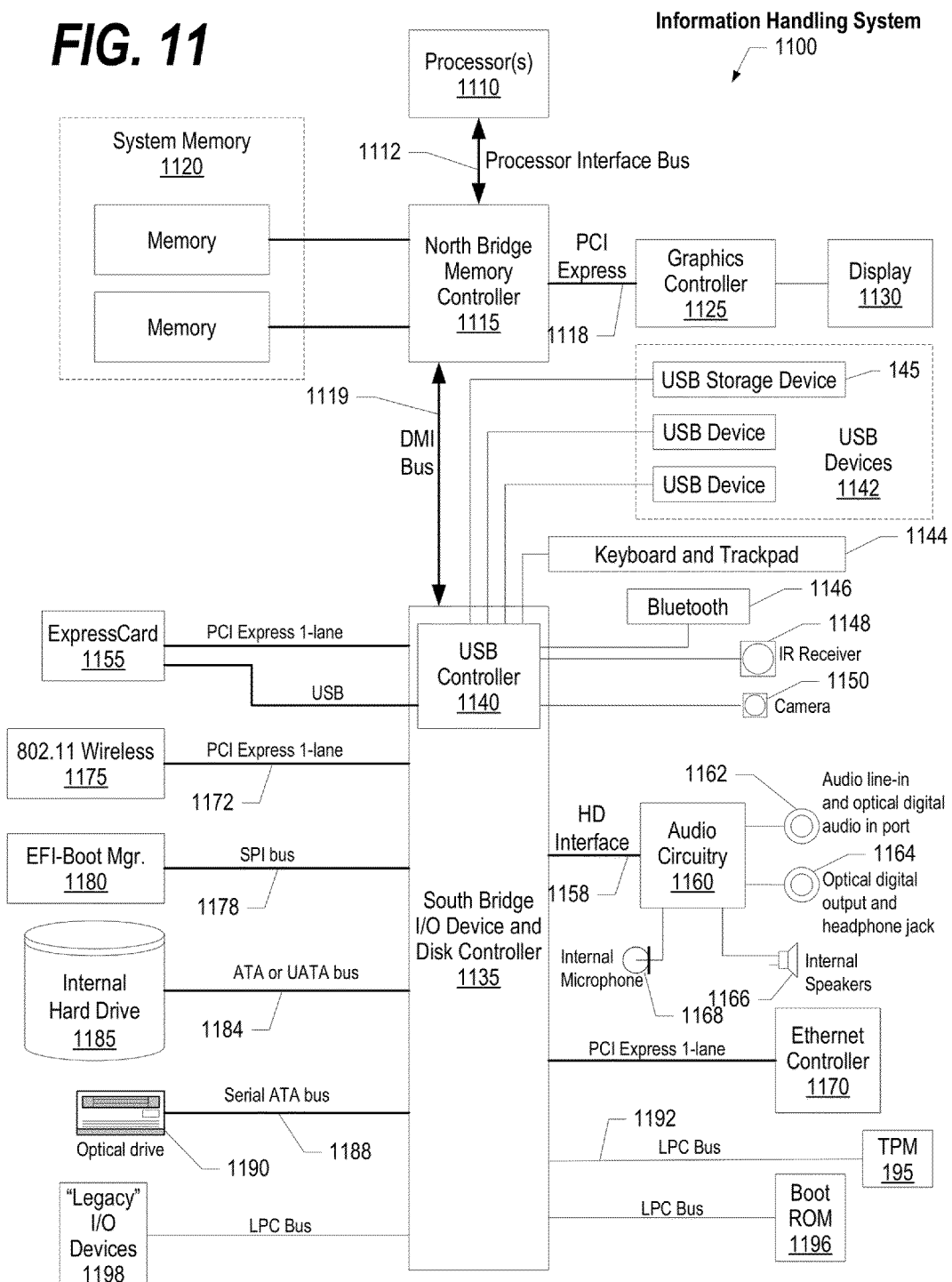
FIG. 11 is a block diagram of a data processing system in which the methods described herein can be implemented.

FIG. 11 illustrates information handling system 1100, which is a simplified example of a computer system capable of performing the computing operations described herein. Information handling system 1100 includes one or more processors 1110 coupled to processor interface bus 1112. Processor interface bus 1112 connects processors 1110 to Northbridge 1115, which is also known as the Memory Controller Hub (MCH). Northbridge 1115 connects to system memory 1120 and provides a means for processor(s) 1110 to access the system memory. Graphics controller 1125 also connects to Northbridge 1115. In one embodiment, PCI Express bus 1118 connects Northbridge 1115 to graphics controller 1125. Graphics controller 1125 connects to display device 1130, such as a computer monitor.

Northbridge 1115 and Southbridge 1135 connect to each other using bus 1119. In one embodiment, the bus is a Direct Media Interface (DMI) bus that transfers data at high speeds in each direction between Northbridge 1115 and Southbridge 1135. In another embodiment, a Peripheral Component Interconnect (PCI) bus connects the Northbridge and the Southbridge. Southbridge 1135, also known as the I/O Controller Hub (ICH) is a chip that generally implements capabilities that operate at slower speeds than the capabilities provided by the Northbridge. Southbridge 1135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 1196 and "legacy" I/O devices (using a "super I/O" chip). The "legacy" I/O devices (1198) can include, for example, serial and parallel ports, keyboard, mouse, and/or a floppy disk controller. The LPC bus also connects Southbridge 1135 to Trusted Platform Module (TPM) 1195. Other components often included in Southbridge 1135 include a Direct Memory Access (DMA) controller, a Programmable Interrupt Controller (PIC), and a storage device controller, which connects Southbridge 1135 to nonvolatile storage device 1185, such as a hard disk drive, using bus 1184.

ExpressCard 1155 is a slot that connects hot-pluggable devices to the information handling system. ExpressCard 1155 supports both PCI Express and USB connectivity as it connects to Southbridge 1135 using both the Universal Serial Bus (USB) the PCI Express bus. Southbridge 1135 includes USB Controller 1140 that provides USB connectivity to devices that connect to the USB. These devices include webcam (camera) 1150, infrared (IR) receiver 1148, keyboard and trackpad 1144, and Bluetooth device 1146, which provides for wireless personal area networks (PANs). USB Controller 1140 also provides USB connectivity to other miscellaneous USB connected devices 1142, such as a mouse, removable nonvolatile storage device 1145, modems, network cards, ISDN connectors, fax, printers, USB hubs, and many other types of USB connected devices. While removable nonvolatile storage device 1145 is shown as a USB-connected device, removable nonvolatile storage device 1145 could be connected using a different interface, such as a Firewire interface, etcetera.

Wireless Local Area Network (LAN) device 1175 connects to Southbridge 1135 via the PCI or PCI Express bus 1172. LAN device 1175 typically implements one of the IEEE 802.11 standards of over-the-air modulation techniques that all use the same protocol to wirelessly communicate between information handling system 1100 and another computer system or device. Optical storage device 1190 connects to Southbridge 1135 using Serial ATA (SATA) bus 1188. Serial ATA adapters and devices communicate over a high-speed serial link. The Serial ATA bus also connects Southbridge 1135 to other forms of storage devices, such as hard disk drives. Audio circuitry 1160, such as a sound card, connects to Southbridge 1135 via bus 1158. Audio circuitry 1160 also provides functionality such as audio line-in and optical digital audio in port 1162, optical digital output and headphone jack 1164, internal speakers 1166, and internal microphone 1168. Ethernet controller 1170 connects to Southbridge 1135 using a bus, such as the PCI or PCI Express bus. Ethernet controller 1170 connects information handling system 1100 to a computer network, such as a Local Area Network (LAN), the Internet, and other public and private computer networks.

While FIG. 11 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 1195) shown in FIG. 11 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 12.

Figure 12:
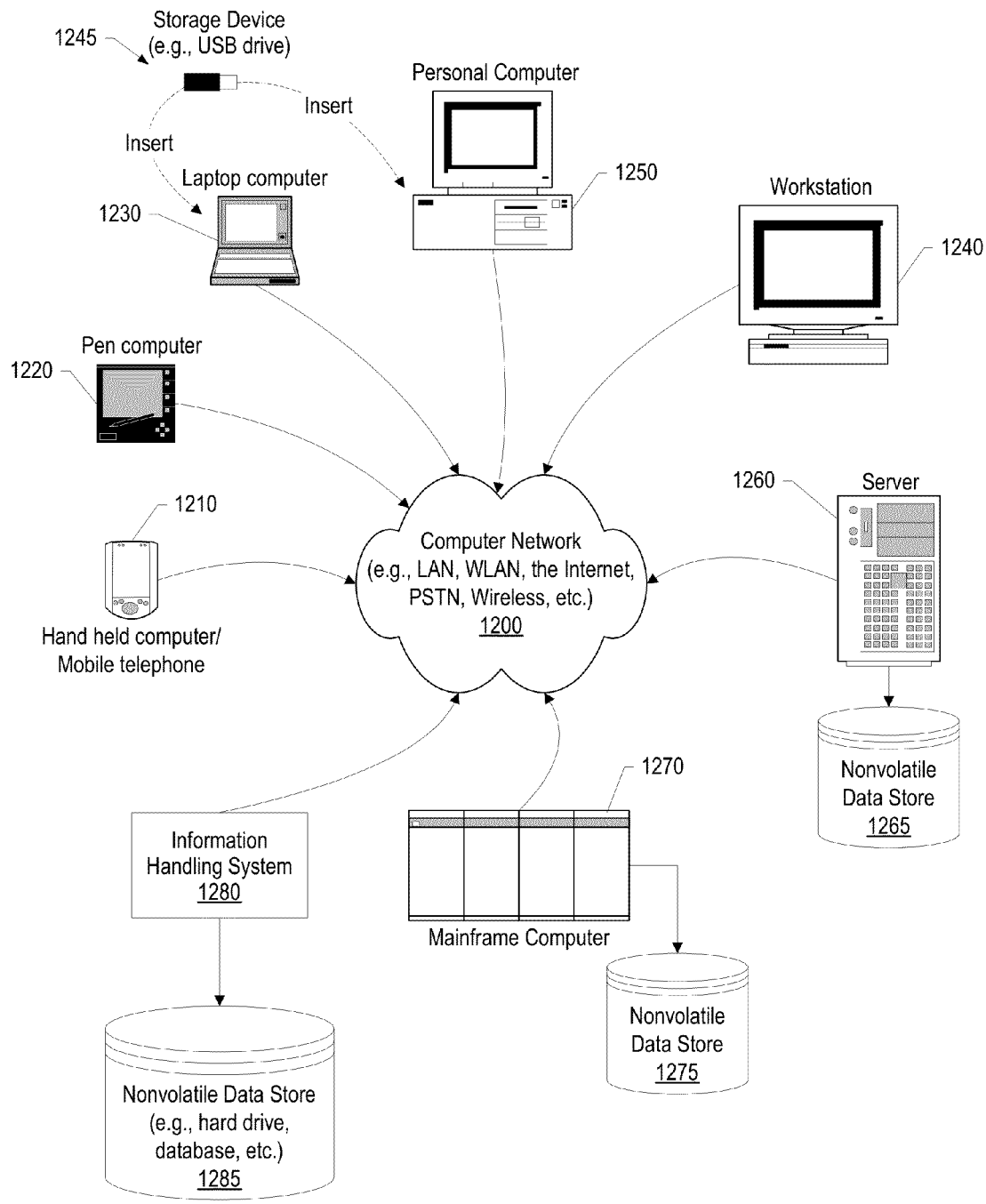
FIG. 12 provides an extension of the information handling system environment shown in FIG. 11 to illustrate that the methods described herein can be performed on a wide variety of information handling systems which operate in a networked environment.

FIG. 12 provides an extension of the information handling system environment shown in FIG. 11 to illustrate that the methods described herein can be performed on a wide variety of information handling systems that operate in a networked environment. Types of information handling systems range from small handheld devices, such as handheld computer/mobile telephone 1210 to large mainframe systems, such as mainframe computer 1270. Examples of handheld computer 1210 include personal digital assistants (PDAs), personal entertainment devices, such as MP3 players, portable televisions, and compact disc players. Other examples of information handling systems include pen, or tablet, computer 1220, laptop, or notebook, computer 1230, workstation 1240, personal computer system 1250, and server 1260. Other types of information handling systems that are not individually shown in FIG. 12 are represented by information handling system 1280. As shown, the various information handling systems can be networked together using computer network 1200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 12 depicts separate nonvolatile data stores (server 1260 utilizes nonvolatile data store 1265, mainframe computer 1270 utilizes nonvolatile data store 1275, and information handling system 1280 utilizes nonvolatile data store 1285). The nonvolatile data store can be a component that is external to the various information handling systems or can be internal to one of the information handling systems. In addition, removable nonvolatile storage device 1145 can be shared among two or more information handling systems using various techniques, such as connecting the removable nonvolatile storage device 1145 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
   receiving, at a local module, a data frame initiated by a first virtual machine, wherein the data frame has a target destination at a second virtual machine that executes on a destination host;
   identifying a destination global queue pair number and a destination local port ID that correspond to the second virtual machine, wherein the destination global queue pair number is independent of the destination host;
   including the destination global queue pair number and the destination local port ID in an overlay header;
   encapsulating the data frame with the overlay header, the encapsulating resulting in an encapsulated frame; and
   sending the encapsulated frame through a computer network to the second virtual machine.

2. The method of claim 1 wherein the first virtual machine executes on a source host and wherein the source host and the destination host are included in a computer subnetwork, the method further comprising:
   migrating the second virtual machine from the destination host to a new destination host that is included in the computer subnetwork; and updating, by a distributed policy service, a subnetwork table entry corresponding to the destination global queue pair number, wherein the updating includes maintaining association of the destination global queue pair number to the first virtual machine and replacing the destination local port ID with a subsequent destination local port ID that corresponds to the new destination host.

3. The method of claim 2 further comprising:
determining, by the local module, that the destination local port ID is not valid;
querying the distributed policy service by the local module for an updated local port ID that corresponds to the destination global queue pair number;
receiving the updated destination local port ID from the distributed policy service at the local module in response to the querying; and
storing the updated destination local port ID in a local table entry corresponding to the destination global queue pair number.

4. The method of claim 2 further comprising:
receiving an allocation request from a third virtual machine at the local module for a new global queue pair number, the third virtual machine executing on the source host;
querying the distributed policy service for the new global queue pair number;
receiving, from the distributed policy service, the new global queue pair number at the local module;
identifying a source local port ID that corresponds to an adapter located on the source host;
generating a local table entry in a local storage area that includes the new global queue pair number and the source local port ID; and
notifying the distributed policy service of the source local port ID that corresponds to the new global queue pair number.

5. The method of claim 4 further comprising:
receiving a de-allocation request from the third virtual machine at the local module to de-allocate the new global queue pair number;
removing the local table entry from the local storage area; and
notifying the distributed policy service to de-allocate the new global queue pair number from the third virtual machine.

6. The method of claim 2 wherein the computer subnetwork includes a plurality of virtual domains that each correspond to one of a plurality of heterogeneous tenants, and wherein the source host and the destination host belong to one of the plurality of virtual domains, the method further comprising:
identifying one or more physical path translations that are based upon a logical connectivity between the first virtual machine and the second virtual machine, wherein the logical connectivity is independent of one or more physical topology constraints of the computer subnetwork; and
including the one or more physical path translations in the overlay header.

7. The method of claim 1 further comprising:
receiving, at the destination host, the encapsulated frame;
decapsulating the encapsulated frame and extracting the destination global queue pair number from the overlay header;
identifying a virtual function that corresponds to the destination global queue pair number; and
forwarding the data frame to the second virtual machine through the identified virtual function.

8. The method of claim 1 wherein:
the data frame includes a local routing header, a base transport header, and is devoid of a global routing header; and
the destination global queue pair number corresponds to a send queue, a receive queue, and a completion queue associated with the second virtual machine.

9. An information handling system comprising:
one or more processors;
a memory coupled to at least one of the processors;
a set of computer program instructions stored in the memory and executed by at least one of the processors in order to perform actions of:
receiving, at a local module, a data frame initiated by a first virtual machine, wherein the data frame has a target destination at a second virtual machine that executes on a destination host;
identifying a destination global queue pair number and a destination local port ID that correspond to the second virtual machine, wherein the destination global queue pair number is independent of the destination host;
including the destination global queue pair number and the destination local port ID in an overlay header;
encapsulating the data frame with the overlay header, the encapsulating resulting in an encapsulated frame; and
sending the encapsulated frame through a computer network to the second virtual machine.

10. The information handling system of claim 9 wherein the first virtual machine executes on a source host and wherein the source host and the destination host are included in a computer subnetwork, the processors performing additional actions comprising:
migrating the second virtual machine from the destination host to a new destination host that is included in the computer subnetwork; and
updating, by a distributed policy service, a subnetwork table entry corresponding to the destination global queue pair number, wherein the updating includes maintaining association of the destination global queue pair number to the first virtual machine and replacing the destination local port ID with a subsequent destination local port ID that corresponds to the new destination host.

11. The information handling system of claim 10 wherein the processors perform additional actions comprising:
determining, by the local module, that the destination local port ID is not valid;
querying the distributed policy service by the local module for an updated local port ID that corresponds to the destination global queue pair number;
receiving the updated destination local port ID from the distributed policy service at the local module in response to the querying; and
storing the updated destination local port ID in a local table entry corresponding to the destination global queue pair number.

12. The information handling system of claim 10 wherein the processors perform additional actions comprising:
receiving an allocation request from a third virtual machine at the local module for a new global queue pair number, the third virtual machine executing on the source host;
querying the distributed policy service for the new global queue pair number;
receiving, from the distributed policy service, the new global queue pair number at the local module;

identifying a source local port ID that corresponds to an adapter located on the source host;
generating a local table entry in a local storage area that includes the new global queue pair number and the source local port ID; and
notifying the distributed policy service of the source local port ID that corresponds to the new global queue pair number.

13. The information handling system of claim 12 wherein the processors perform additional actions comprising:
receiving a de-allocation request from the third virtual machine at the local module to de-allocate the new global queue pair number;
removing the local table entry from the local storage area; and
notifying the distributed policy service to de-allocate the new global queue pair number from the third virtual machine.

14. The information handling system of claim 10 wherein the computer subnetwork includes a plurality of virtual domains that each correspond to one of a plurality of heterogeneous tenants, and wherein the source host and the destination host belong to one of the plurality of virtual domains, the processors performing additional actions comprising:
identifying one or more physical path translations that are based upon a logical connectivity between the first virtual machine and the second virtual machine, wherein the logical connectivity is independent of one or more physical topology constraints of the computer subnetwork; and
including the one or more physical path translations in the overlay header.

15. The information handling system of claim 9 wherein the processors perform additional actions comprising:
receiving, at the destination host, the encapsulated frame;
decapsulating the encapsulated frame and extracting the destination global queue pair number from the overlay header;
identifying a virtual function that corresponds to the destination global queue pair number; and
forwarding the data frame to the second virtual machine through the identified virtual function.

16. The information handling system of claim 9 wherein:
the data frame includes a local routing header, a base transport header, and is devoid of a global routing header; and
the destination global queue pair number corresponds to a send queue, a receive queue, and a completion queue associated with the second virtual machine.

17. A computer program product stored in a computer readable storage device, comprising computer program code that, when executed by an information handling system, causes the information handling system to perform actions comprising:
receiving, at a local module, a data frame initiated by a first virtual machine, wherein the data frame has a target destination at a second virtual machine that executes on a destination host;
identifying a destination global queue pair number and a destination local port ID that correspond to the second virtual machine, wherein the destination global queue pair number is independent of the destination host;
including the destination global queue pair number and the destination local port ID in an overlay header;
encapsulating the data frame with the overlay header, the encapsulating resulting in an encapsulated frame; and
sending the encapsulated frame through a computer network to the second virtual machine.

18. The computer program product of claim 17 wherein the first virtual machine executes on a source host and wherein the source host and the destination host are included in a computer subnetwork, the information handling system performing additional actions comprising:
migrating the second virtual machine from the destination host to a new destination host that is included in the computer subnetwork; and
updating, by a distributed policy service, a subnetwork table entry corresponding to the destination global queue pair number, wherein the updating includes maintaining association of the destination global queue pair number to the first virtual machine and replacing the destination local port ID with a subsequent destination local port ID that corresponds to the new destination host.

19. The computer program product of claim 18 wherein the information handling system performs additional actions comprising:
determining, by the local module, that the destination local ID is not valid;
querying the distributed policy service by the local module for an updated local port ID that corresponds to the destination global queue pair number;
receiving the updated destination local port ID from the distributed policy service at the local module in response to the querying; and
storing the updated destination local port ID in a local table entry corresponding to the destination global queue pair number.

20. The computer program product of claim 18 wherein the information handling system performs additional actions comprising:
receiving an allocation request from a third virtual machine at the local module for a new global queue pair number, the third virtual machine executing on the source host;
querying the distributed policy service for the new global queue pair number;
receiving, from the distributed policy service, the new global queue pair number at the local module;
identifying a source local port ID that corresponds to an adapter located on the source host;
generating a local table entry in a local storage area that includes the new global queue pair number and the source local port ID; and
notifying the distributed policy service of the source local port ID that corresponds to the new global queue pair number.

21. The computer program product of claim 20 wherein the information handling system performs additional actions comprising:
receiving a de-allocation request from the third virtual machine at the local module to de-allocate the new global queue pair number;
removing the local table entry from the local storage area; and
notifying the distributed policy service to de-allocate the new global queue pair number from the third virtual machine.

22. The computer program product of claim 18 wherein the computer subnetwork includes a plurality of virtual domains that each correspond to one of a plurality of heterogeneous tenants, and wherein the source host and the destination host belong to one of the plurality of virtual domains, the information handling system performing additional actions comprising:

identifying one or more physical path translations that are based upon a logical connectivity between the first virtual machine and the second virtual machine, wherein the logical connectivity is independent of one or more physical topology constraints of the computer subnetwork; and including the one or more physical path translations in the overlay header.

23. The computer program product of claim 17 wherein the information handling system performs additional actions comprising:

receiving, at the destination host, the encapsulated frame;

decapsulating the encapsulated frame and extracting the destination global queue pair number from the overlay header;

identifying a virtual function that corresponds to the destination global queue pair number; and forwarding the data frame to the second virtual machine through the identified virtual function.

24. The computer program product of claim 17 wherein:

the data frame includes a local routing header, a base transport header, and is devoid of a global routing header; and the destination global queue pair number corresponds to a send queue, a receive queue, and a completion queue associated with the second virtual machine.

25. A method comprising:

receiving, at a local module, a data frame initiated by a first virtual machine that executes on a first host, wherein the data frame has a target destination at a second virtual machine that executes on a second host;

identifying a destination global queue pair number and a destination local port ID that correspond to the second virtual machine, wherein the destination global queue pair number is independent of the destination host;

determining, by the local module, that the destination local port ID is not valid;

querying a distributed policy service by the local module for an updated local port ID that corresponds to the destination global queue pair number;

receiving the updated destination local port ID from the distributed policy service at the local module in response to the querying, wherein the updated destination local port ID corresponds to a third host to which the second virtual machine migrated;

including the destination global queue pair number and the updated destination local port ID in an overlay header;

encapsulating the data frame with the overlay header, the encapsulating resulting in an encapsulated frame; and sending the encapsulated frame through a computer network to the second virtual machine executing on the third host.

* * * * *